US006802556B2

United States Patent
Mattsson et al.

(12) 
(10) Patent No.: US 6,802,556 B2
(45) Date of Patent: Oct. 12, 2004

(54) PEDESTRIAN SAFETY DEVICE (75) Inventors: Mikael Mattsson, Molndal (SE); Mattias Ericsson, Varberg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/604,734

(22) Filed: Aug. 13, 2003

(65) Prior Publication Data
US 2004/0113459 A1 Jun. 17, 2004

(51) Int. Cl.$^7$ ................................................ B60J 7/00
(52) U.S. Cl. ........................... 296/187.09; 180/69.21; 180/274
(58) Field of Search ................ 296/187.04, 187.09, 296/203.02; 180/69.2, 69.21, 274

(56) References Cited

U.S. PATENT DOCUMENTS

| | | | | |
|---|---|---|---|---|
| 5,385,212 A | * | 1/1995 | Cady et al. ............... | 180/69.21 |
| 6,182,782 B1 | * | 2/2001 | Matsuura et al. ........... | 180/274 |
| 6,217,108 B1 | * | 4/2001 | Sasaki .................... | 296/187.09 |
| 6,257,657 B1 | * | 7/2001 | Sasaki .................... | 296/187.09 |
| 6,293,362 B1 | * | 9/2001 | Sasaki et al. .............. | 180/274 |
| 6,311,796 B1 | * | 11/2001 | Mayer ....................... | 180/69.2 |
| 6,329,910 B1 | * | 12/2001 | Farrington .................. | 340/436 |
| 6,332,115 B1 | * | 12/2001 | Nobusawa et al. .......... | 180/274 |
| 6,345,679 B1 | * | 2/2002 | Sasaki ..................... | 180/274 |
| 6,364,402 B1 | * | 4/2002 | Sasaki .................... | 296/187.09 |
| 6,415,883 B1 | * | 7/2002 | Myrholt et al. ............. | 180/274 |
| 6,439,330 B1 | * | 8/2002 | Paye ......................... | 180/274 |
| 6,520,276 B2 | * | 2/2003 | Sasaki et al. ............... | 180/274 |
| 2002/0014761 A1 | * | 2/2002 | Miyasaka et al. ......... | 280/730.1 |
| 2002/0017409 A1 | * | 2/2002 | Peter ......................... | 180/69.2 |
| 2002/0033294 A1 | * | 3/2002 | Ishizaki et al. ............. | 180/274 |
| 2002/0033755 A1 | * | 3/2002 | Ishizaki et al. ............. | 340/436 |
| 2002/0043417 A1 | * | 4/2002 | Ishizaki et al. ............. | 180/274 |
| 2003/0051936 A1 | * | 3/2003 | Ishizaki et al. ............. | 180/274 |

* cited by examiner

*Primary Examiner*—Lori L. Coletta
(74) *Attorney, Agent, or Firm*—Gigette M. Bejin (57) ABSTRACT

A pedestrian safety device for automotive vehicle (1) having a hood (2) being hinged and releasably latched to the vehicle body. An actuator member (6) is arranged transversally inside the upper forward region of the vehicle (1) and the ends of the actuator member respectively slideably hinged (11) in a respective inclining guide track (12*a*) extending rearwards within the vehicle (1). The hinges (11) are arranged to carry a respective first lifting member (14) arranged to carry a respective first lifting member (14) arranged for vertical sliding in respect to the vehicle body. The first lifting members (14) are arranged below the hood (2) such that they will be brought to uplift the hood (2) in the region of its leading edge (2*a*) upon the hinges (11) carrying it being translated up the inclining guide tracks (12*a*) as a result of collision impact on the actuator member (6).

8 Claims, 7 Drawing Sheets

Fig. 8

PEDESTRIAN SAFETY DEVICE

BACKGROUND OF INVENTION

1. Technical Field

The present patent application relates to a pedestrian safety device and in particular a pedestrian safety device for automotive vehicles.

2. Background of the Invention

Motor vehicle manufacturers, for visibility, aerodynamic and styling reasons, usually design new motor cars where the hood line is kept as low as possible. As a result, there is generally very little clearance between the deformable and thereby energy absorbing hood and the usually more solid engine bay contents of the automotive vehicles, such as the engine. Several proposals have been made to increase the cushioning effect of the hood when impacted by a pedestrian during an accident through increasing the clearance between the hood and the underlying engine bay contents. One such device which is arranged to lower the leading edge of the hood and raise the trailing edge of hood when impacted by a pedestrian is previously known through EP 1 078 826.

SUMMARY OF INVENTION

One object of the invention is to provide an improved pedestrian safety device and in particular an improved pedestrian safety device for automotive vehicles able to account for both adult and child pedestrians being impacted.

BRIEF DESCRIPTION OF DRAWINGS

In the following, the invention will be described in greater detail with reference to attached drawings, in which.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

Figure 1:
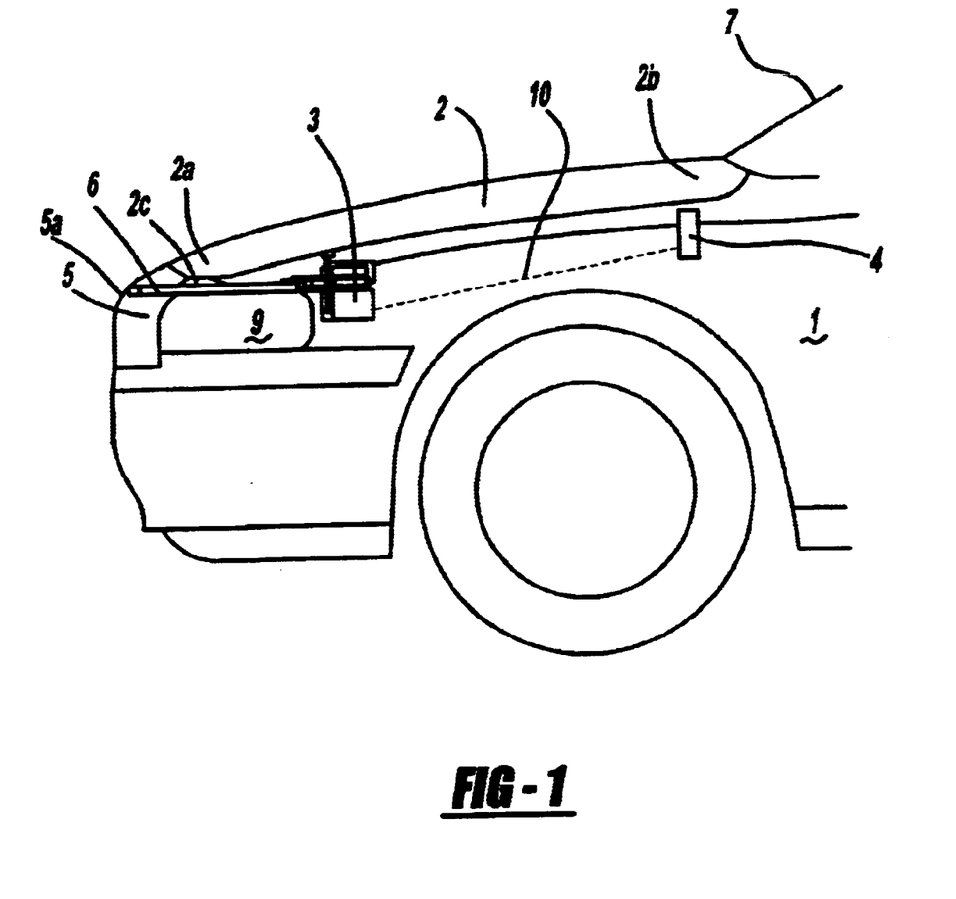
FIG. 1 is a schematic illustration of a pedestrian safety device according to a first embodiment of the invention and as applied to a vehicle before pedestrian impact.

A simplified side view of the pedestrian safety device applied to an automotive vehicle is shown in FIG. 1. The safety device is applied to the automotive vehicle 1, which comprises an openable and re-closeable hood 2 covering an engine bay, which hood 2 has a leading edge 2a and a trailing edge 2b, which hood 2 for opening and closing thereof is hinged to the vehicle body and releasably latched to the vehicle body by means of a latch mechanism. In the described example, it is assumed that the latch mechanism 2c is located at the hood's leading edge 2a and the hinge arrangement (not shown) is located at the hood's trailing edge 2b, although it is also possible to apply the invention when the hinge arrangement is located at the hood's leading edge 2a.

The safety device comprises a pair of front end safety modules 3, which are located beneath the hood's leading edge 2a and attached to the body structure of the vehicle 1 at the left-hand side and right-hand side of the hood 2 and which front end safety modules 3 does not interfere with the conventional latch mechanism in normal operation conditions. The hinge arrangement also behaves in a conventional manner in normal operation conditions. A pair of rear end safety modules 4 are arranged beneath the hood's trailing edge 2b and attached to the body structure of the vehicle 1 at the left-hand side and righthand side of the hood 2.

The automotive vehicle 1 is preferably provided with a deformable forward section 5, e.g. a so called soft-nose, protruding further in the forward direction of the vehicle 1 than the leading edge 2a of the hood 2 extending the hood line of the vehicle 1, whereby an actuator member 6 can be arranged transversally inside the upper forward region of the vehicle 1 and be affected upon impact with a pedestrian, before the pedestrian contacts the actual hood 2. However, in the case of the vehicle 1 not being provided with a deformable forward section 5, as described above, the leading edge 2a of the hood 2 can be arranged to allow for sufficient deformation upon impact, whereby the actuator member 6 can be arranged below the leading edge 2a of the hood 2. The actuator member design may be incorporated into a grille opening reinforcement assembly 5a the vehicle 1.

According to the invention it is proposed to use the vehicle leading edge, preferably as provided by the forward section 5, as a physical trigger. This, however, suffers from the drawback that it will not be possible to differentiate impacted objects from each other. In order to minimize the number of false impacts it is proposed to use a speed dependent lock (not shown). Hereby the system will deploy for every object that weighs as a human or more that hits the automotive vehicle 1 at the vehicle leading edge in a specified speed range, e.g. 15–50 km/h, as below 15 km/h the impact will be quite soft and there is hence no need to uplift the hood 2 and above 50 km/h a pedestrian struck is likely to fly past the hood 2 and impact upon the windscreen 7 of the vehicle 1.

The front and rear end safety modules 3, 4 are interconnected such that the rear end safety modules 4 will be activated when the front end safety modules 3 are activated. Both the latch mechanism and the hinge mechanism by which the hood 2 is attached to the vehicle 1, are arranged to allow the whole hood 2 to be lifted along its full length when the actuator member 6 is impacted by a pedestrian during an accident.

Figure 2:
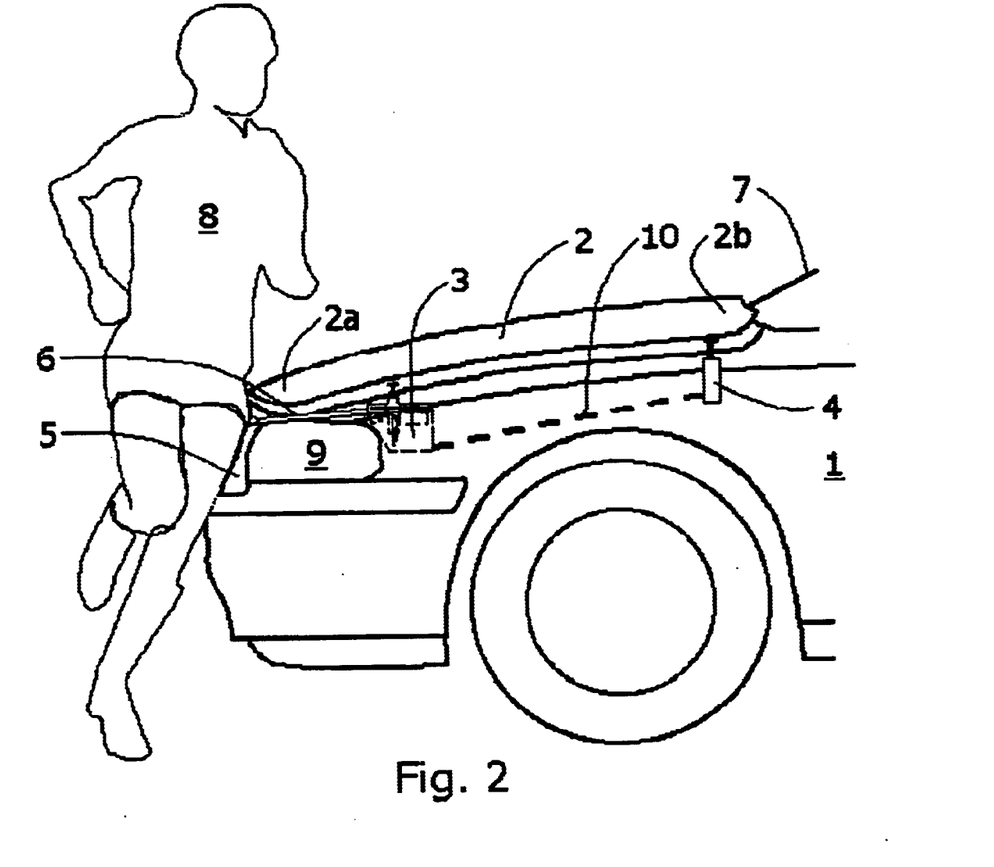
FIG. 2 is a schematic illustration of the pedestrian safety device according to FIG. 1 in a deployed position upon pedestrian impact.

FIG. 2 shows the pedestrian safety device in deployed condition. During an impact between any position on the actuator member 6 and a pedestrian 8 hip/upper leg, the impact energy is used to mechanically activate the front end safety modules 3, which in turn uplifts the leading edge 2a of the hood 2, and activates the rear end safety modules 4 causing the hood's trailing edge 2b to be also uplifted.

The actuator member 6 can preferably be arranged to perform additional functions of the vehicle 1, such as carrying the headlights 9 thereof, which headlights 9 in such a configuration would function as an integral part of the safety system if impacted upon collision.

Analysis of energy levels from a child accident have shown that the kinetic energy from the body is insufficient for lifting the entire hood 2 the required distance within the required time intervals. Therefore the system is optimized for quickly lifting the front end of the hood 2a (child head zone) before any energy is diverted for other purposes. The rear end of the hood 2b (adult head zone) must therefore be lifted by other means than energy from the impact. According to the invention it is suggested that the rear end 2a of the hood 2 is lifted by a system which does not rely on energy from the impact, such as a pre loaded spring device, as will be described in more detail later, released for example by a wire 10 (illustrated as a broken line) connected to the front end safety modules 3.

The actuator member 6 can also be arranged to carry a frame (not shown) arranged to carry the cooling system of the vehicle 1, such as the engine cooling radiator and the condenser of the air-conditioning system and associated components. This frame can further be arranged to perform rotation of the cooling system upon impact with an adult pedestrian as described in more detail below, through the frame being hinged to the vehicle body in a lower region thereof and hinged to the actuator member 6 in an upper region thereof.

Figure 8:
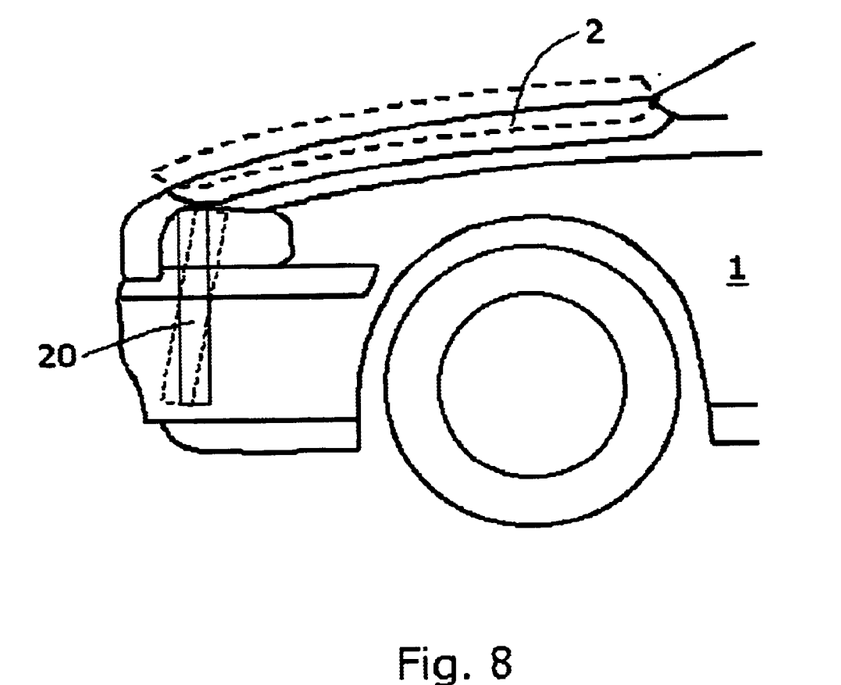
FIG. 8 is a schematic illustration of cooling-package rotation effected by the pedestrian safety device upon impact with an adult pedestrian.

As shown in FIG. 2 the pedestrian 8 impacted triggers the system by the actuator member 6 or the headlights 9 attached thereto. During the initial deformation, e.g. the initial 60 millimeters, all energy from the impact is translated to lift the front end of the hood 2a. At the same time the rear end lifting mechanism 4 is activated, i.e. the pre loaded spring device released, and the rear end of the hood 2b is lifted, which is facilitated by the rear end hinge assembly being arranged to allow for a predetermined lifting height. The latch mechanism will be partly released, just in order to allow the hood 2 to move the required distance upwards. If the vehicle is hit by a child, no further actions are effected by the system. However, in case of the vehicle 1 hitting an adult, producing more impact energy, the adult pedestrian 8 will continue to move the actuator member 6, whereby the cooling system is arranged to start to rotate, as illustrated in FIG. 8, downwards and into the engine bay, thereby allowing the hip/upper leg of the pedestrian 8 to penetrate further into the vehicle 1 without encountering a full stop, which thereby also serves to reduce the risk of serious hip/upper leg injuries to the pedestrian 8 impacted.

Figure 3A:
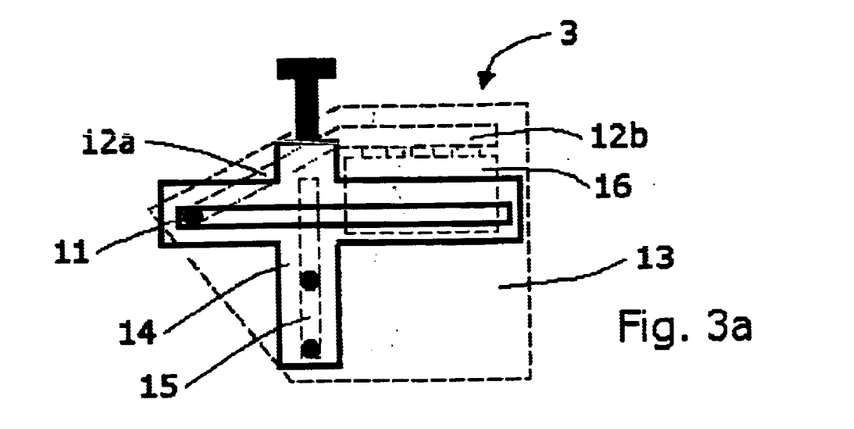
FIGS. 3a, 3b and 3c illustrates schematically a front end safety module before and during pedestrian impact.
Figure 3B:
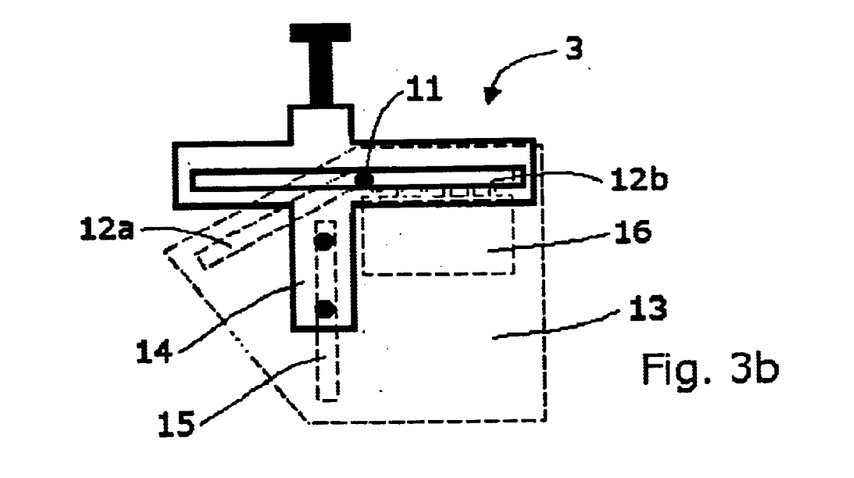
Figure 3C:
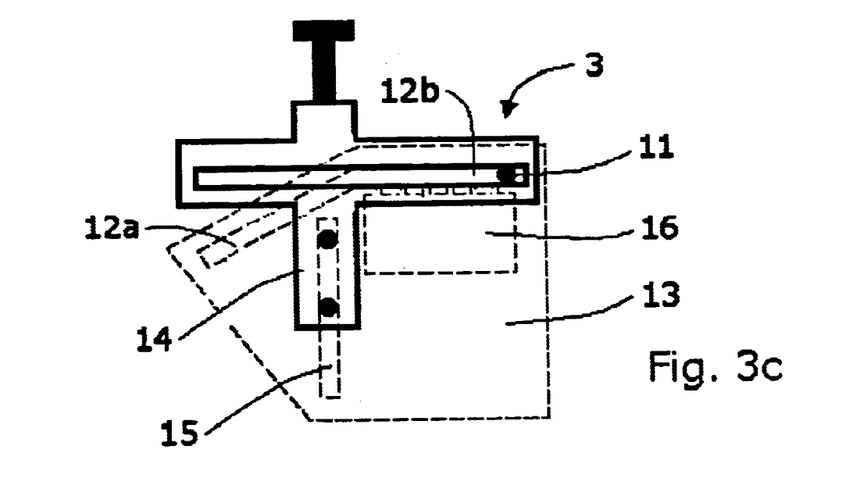

FIGS. 3a, 3b and 3c illustrates how a front end safety module can be arranged to be affected by the actuator member 6 during an impact in order to produce the uplifting motion for the leading edge 2a of the hood 2. FIG. 3a illustrates the front end safety module 3 before the impact. The ends of said actuator member 6 are respectively slideably hinged 11 in a respective inclining guide track 12a extending rearwards within said vehicle 1 and being fixed to the vehicle body. The inclining guide tracks 12a, as shown in FIG. 3a can be arranged in a guide plate 13 attached to the vehicle body or alternatively (not show) as an integral part of the vehicle body. The hinges 11 of the actuator member 6 are further arranged to carry a respective lifting member 14 arranged for vertical sliding in respect to the vehicle body. As shown in FIG. 3a the lifting members 14 are arranged for sliding in a vertical guide track 15, which as shown also can be arranged in the guide plate 13 attached to the vehicle body or alternatively (not shown) as an integral part of the vehicle body. The lifting members 14 are arranged below the hood 2 such that they will be brought to uplift the hood 2 in the region of its leading edge 2a upon said hinges 11 of the actuator member 6 carrying the lifting members 14 being translated up said inclining guide tracks 12a as a result of a frontal collision impact on said actuator member 6 causing it to be displaced rearwards within the vehicle 1. FIG. 3b illustrates the front end safety module 3 in a deployed position after impact from a collision with a child pedestrian. The hinges 11 of the actuator members 6 having been translated to the highest portions of said inclining guide tracks 12a carrying said lifting members 14 and causing them to uplift the leading edge 2a of the hood 2. FIG. 3c illustrates the front end safety module 3 after further displacement of the hinges 11 of the actuator member 6 after collision with an adult pedestrian, in which case the energy from the collision has been sufficient for translating said hinges 11 of the actuator member 6 further along additional essentially horizontal guide tracks 12b prolonging the respective highest ends of the inclining guide tracks 12a further backwards within said vehicle 1.

Figure 4:
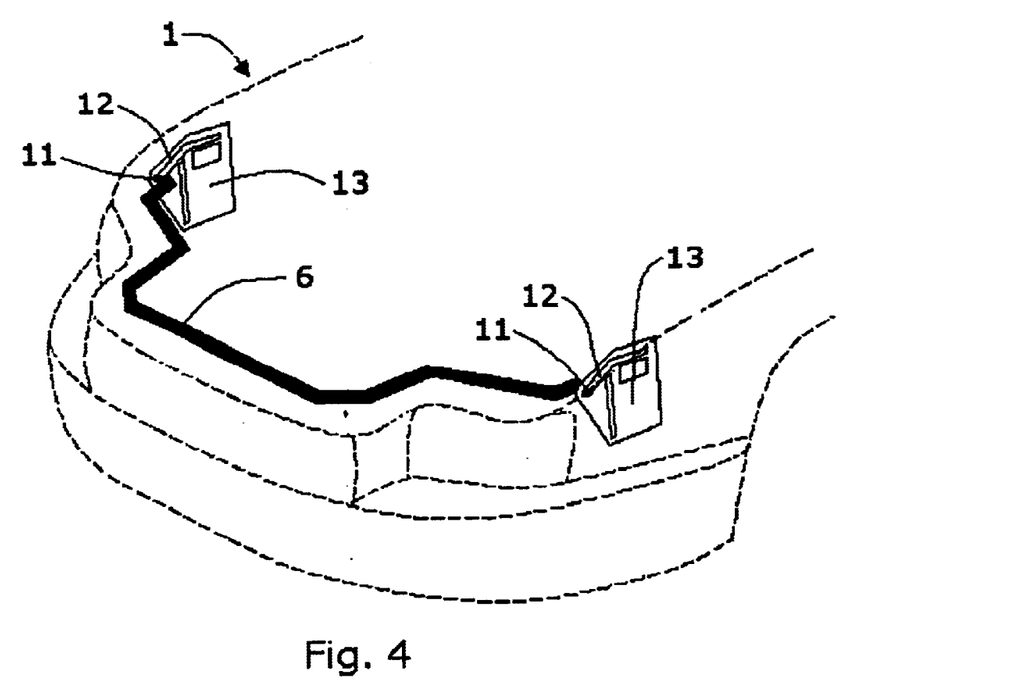
FIG. 4 illustrates in a simplified perspective view a possible configuration of an actuator member of the safety device.

FIG. 4 illustrates in a simplified perspective view a possible configuration of the actuator member 6, which as shown can be given a suitable configuration across the front end of the vehicle 1 dependent on the shape of the front end of the vehicle 1, which vehicle 1 front end is illustrated by the broken lines of FIG. 4. The respective hinges 11 of the actuator member 6 being slideably arranged in the guide tracks 12 of the guide plates 13 of the front end safety modules 3, as described earlier.

Figure 5:
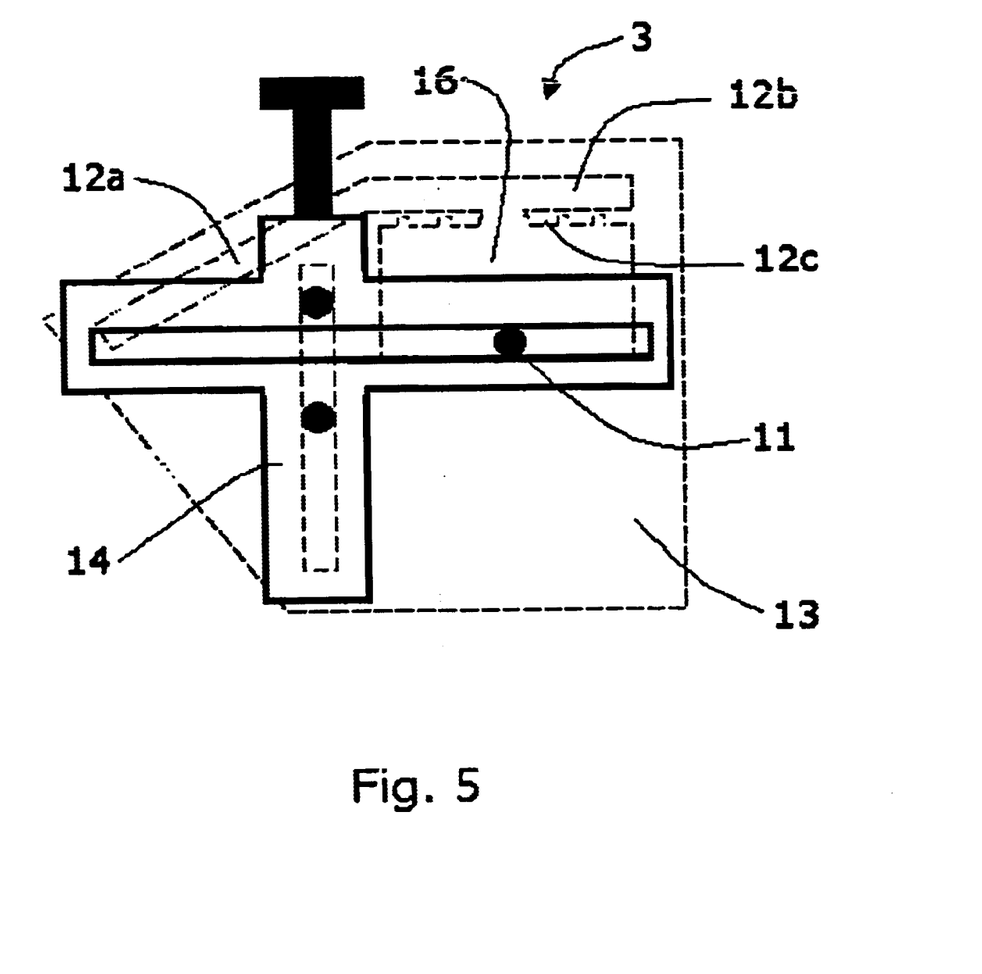
FIG. 5 is a schematic illustration of a safety feature of the front end safety module according to FIGS. 3a, 3b and 3c.

FIG. 5 illustrates a further safety feature of the front end safety module 3, which in the case of the pedestrian 8 striking the hood 2 above the lifting member 14 of the front end safety module 3, ensures that the lifting member 14 does not cause injuries to the pedestrian 8. This is effected through the additional guide tracks 12b for the hinges 11 of the actuator member 6 in the deployed position in accordance with FIG. 3c being arranged above cut out sections 16 in the guide plates 13 or alternatively such that there is sufficient free space below, and that the lower delimiters 12c of said additional guide tracks 12b are arranged to break away upon impact to the hood 2 above said lifting members 14 carried by said hinges 11, allowing said hinges 11 to move downwards into said cut out sections 16 or said free space thus allowing the lifting members 14 carried by the hinges 11 to move downwards as a result of such impact.

The safety device, as shown in FIGS. 1 and 2, further comprises a set of activation wires 10, a respective first end of which are arranged to be translated upon activation of said front end lifting members 14 and a respective second end of which are connected to the respective rear end safety modules 4 and arranged to activate the rear end safety modules, e.g. pre-loaded spring devices 4 upon such translation of the wires 10.

Figure 6A:
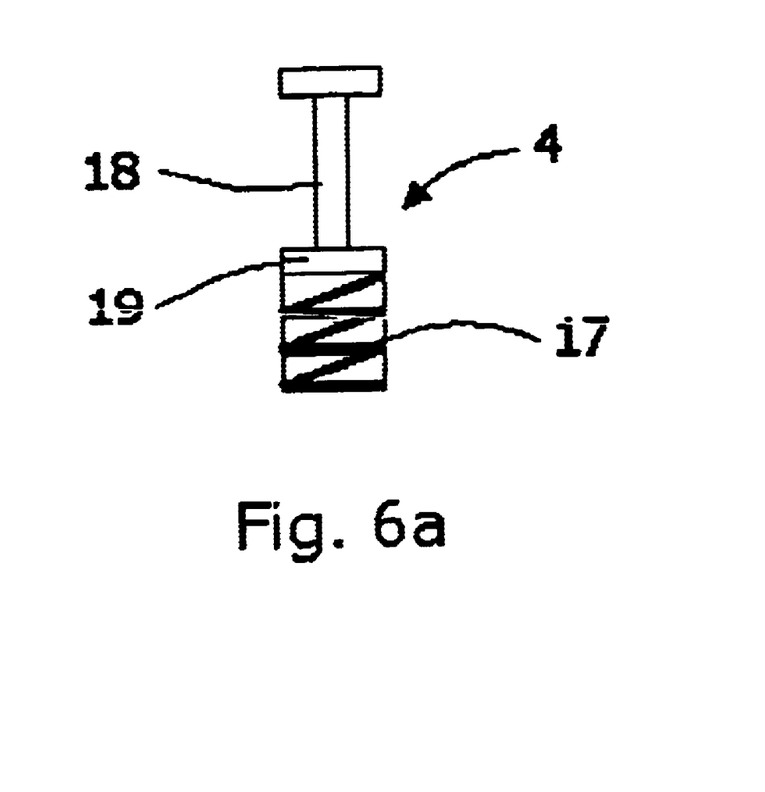
FIGS. 6a and 6b illustrates schematically a rear end safety module before and after pedestrian impact.
Figure 6B:
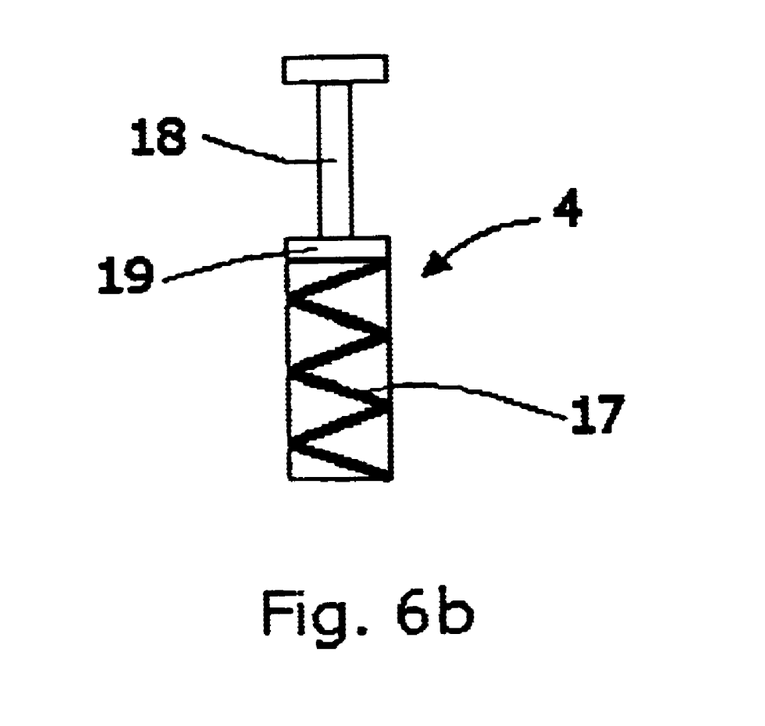

FIGS. 6a and 6b illustrates schematically a possible configuration of the rear end safety modules 4 as pre-loaded spring devices. In FIG. 6a a pre loaded spring 17 is arranged to carry a rear end lifting member 18. A release mechanism (not shown) is connected to one end of an activation wire 10, as described above, such that the release mechanism will release the pre-loaded spring to expand upon translation of the activation wire 10 caused by activation of the front end lifting members 14. FIG. 6b illustrates the pre-loaded spring device of FIG. 6a after activation, i.e. when the pre-loaded spring 17 has been allowed to expand and causing the rear end lifting member 18 to uplift the trailing edge 2b of the hood 2.

Figure 7:
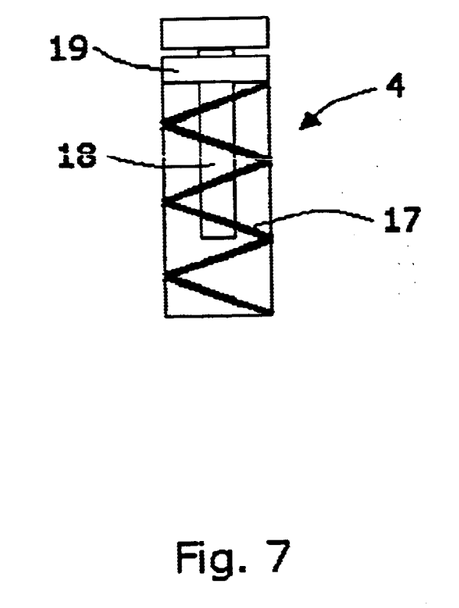
FIG. 7 is a schematic illustration of a safety feature of the rear end safety module according to FIGS. 6a and 6b.

FIG. 7 illustrates a safety feature of the rear end safety modules 4 according to FIGS. 6a and 6b. The rear end lifting members 18 of the pre-loaded spring devices are arranged to be carried by a break away member 19, which break away member 19 is arranged to break-away upon impact to the hood 2 above the rear end lifting members 18, allowing the rear end lifting members 18 to move downwards in respect to the expanded spring 17 as a result of such impact, thereby reducing the risk of head injuries to pedestrians caused by the rear end lifting member 18.

In FIG. 8 is illustrated schematically the case of the vehicle 1 hitting an adult pedestrian. The adult pedestrian 8, causing more impact energy than a child pedestrian, will continue to move the actuator member 6, whereby the cooling package 20 is arranged to start to rotate downwards and into the engine bay of the vehicle 1. The cooling system 20 is illustrated with full lines in its initial position and broken lines in the position acquired as a result of such rotation, the positions of the cooling package 20 corresponding to the positions of the hood 2, illustrated in the same manner. Through this rotation of the cooling package 20 the hip/upper leg of the pedestrian 8 is allowed to penetrate further into the vehicle 1 without encountering a full stop, which thereby also serves to reduce the risk of serious hip/upper leg injuries to the pedestrian 8 impacted. The rotation, as described above is facilitated through that the inclining guide tracks 12a at their respective highest ends are prolonged by additional essentially horizontal guide tracks 12b extending further backwards within said vehicle 1, and in that the cooling package 20 is hinged to the vehicle body in a lower region thereof and hinged to the actuator member 6 in an upper region thereof in such a way that the cooling package 20 will be brought to rotate away from the front end of the vehicle 1 and down into the engine bay of said vehicle 1 as a result of a frontal collision impact on said actuator member 6 of such magnitude that it causes the hinges 11 to be displaced rearwards within said additional guide tracks 12b as illustrated in FIG. 3c.

The invention is not limited to the above-described embodiments, but may be varied within the scope of the following claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pedestrian safety device for automotive vehicles comprising:

an openable and re-closeable hood covering an engine bay, said hood having a leading edge and a trailing edge;

a latch mechanism being operable to releasably latch said hood to the vehicle body; and a hinge having an inclining guide track affixed to the vehicle body and extending rearwards within said vehicle;

an actuator member arranged traversely inside an upper forward region of the vehicle and the ends of the actuator member being slideably hinged in the inclining guide track and the ends of said actuator member being slideably hinged in a respective inclining guide track extending rearwards within said vehicle and being fixed to the vehicle body;

a lifting member arranged for vertical sliding with respect to the vehicle body, the lifting member is arranged below the hood such that the lifting member will uplift the hood upon said hinges, being translated up said inclining guide tracks as a result of a frontal collision impact on said actuator member causing the hood to be displaced rearwards within said vehicle.

2. The pedestrian safety device according to claim 1, further comprising:

a deployment means for releasing the lifting member in a vertical direction within the hinge when the vehicle is operated within predetermined velocity ranges.

3. The pedestrian safety device according to claim 1 further comprising:

a cooling package moveably affixed to the hinge and the actuator member such that the cooling package will be brought to rotate away from the front end of the vehicle and down into the engine bay of said vehicle as a result of a frontal collision impact on said actuator member.

4. A pedestrian safety device according to claim 3, further comprising:

an additional guide track having lower delimiters which are arranged to break away upon a downward impact to the hood and the hinge, allowing the hinge and the hood to move downwards as a result of such impact.

5. A pedestrian safety device according to claim 1 further comprising:

a pre-loaded spring device in communication with the actuator member, the pre-loaded spring device being arranged between the hood and the vehicle body in the region of the trailing edge of the hood, wherein the pre-loaded spring device includes a lifting member being operative to uplift the hood under predetermined conditions.

6. A pedestrian safety device according to claim 5, further comprising:

a plurality of activation wires connecting the lifting member and the pre-loaded spring device, the plurality of activation wires each having a respective first end which are arranged to be translated upon activation of the lifting member and a second end of which are connected to the respective pre-loaded spring device, the plurality of activation wires being operable to transmit a signal to activate the pre-loaded spring devices upon such translation of the wires.

7. A pedestrian safety device according to claim 5, wherein the pre-loaded spring device includes an additional lifting member and the pre-loaded spring device is, arranged to be carried by a break-away member such that the pre-loaded spring device moves in a downward vertical direction upon impact to the hood also allowing said additional lifting members to move downwards as a result of such impact.

8. A pedestrian safety device according to claim 1, wherein the actuator member is incorporated in a grille opening reinforcement assembly of said vehicle.

* * * * *